May 13, 1924.
H. G. HOESLY
MILK COOLING MACHINE
Filed May 7, 1923
1,493,749
3 Sheets-Sheet 2
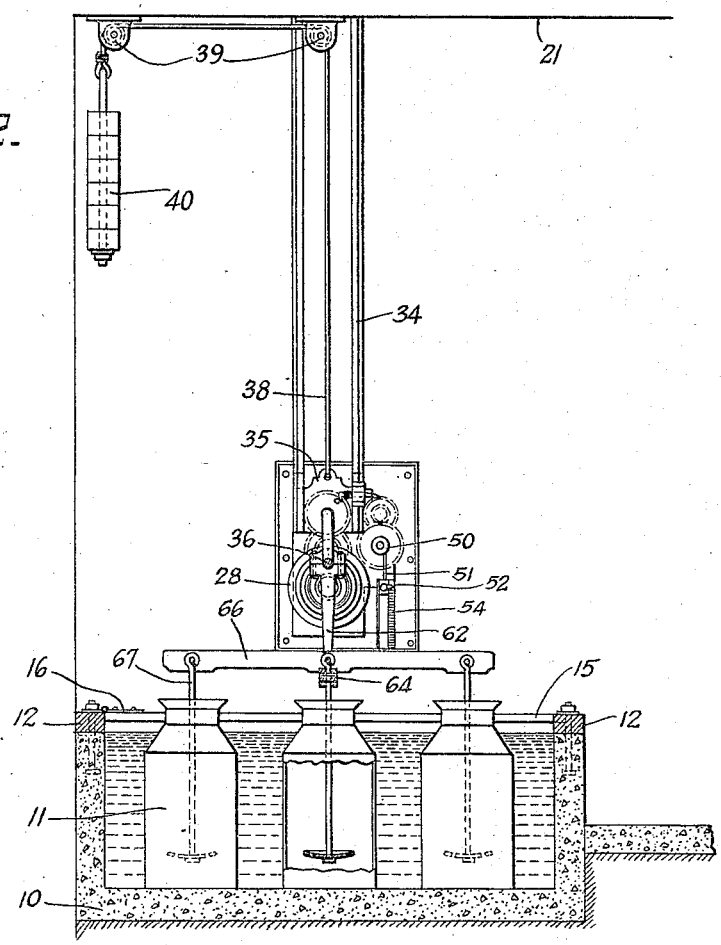
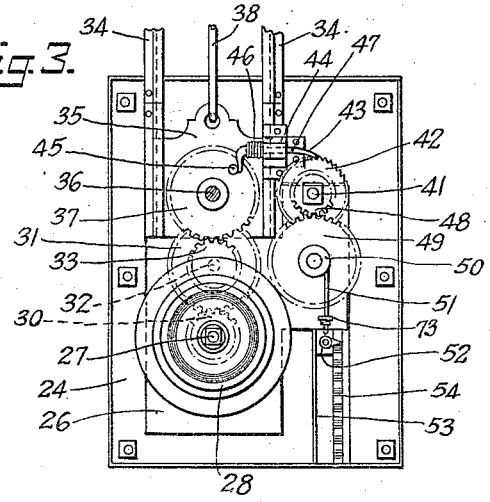
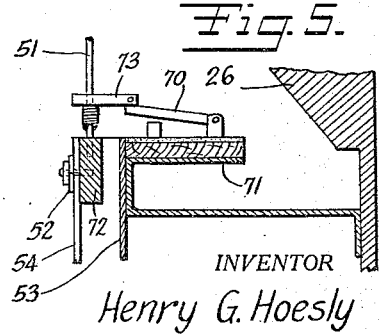
INVENTOR
Henry G. Hoesly
BY
ATTORNEY

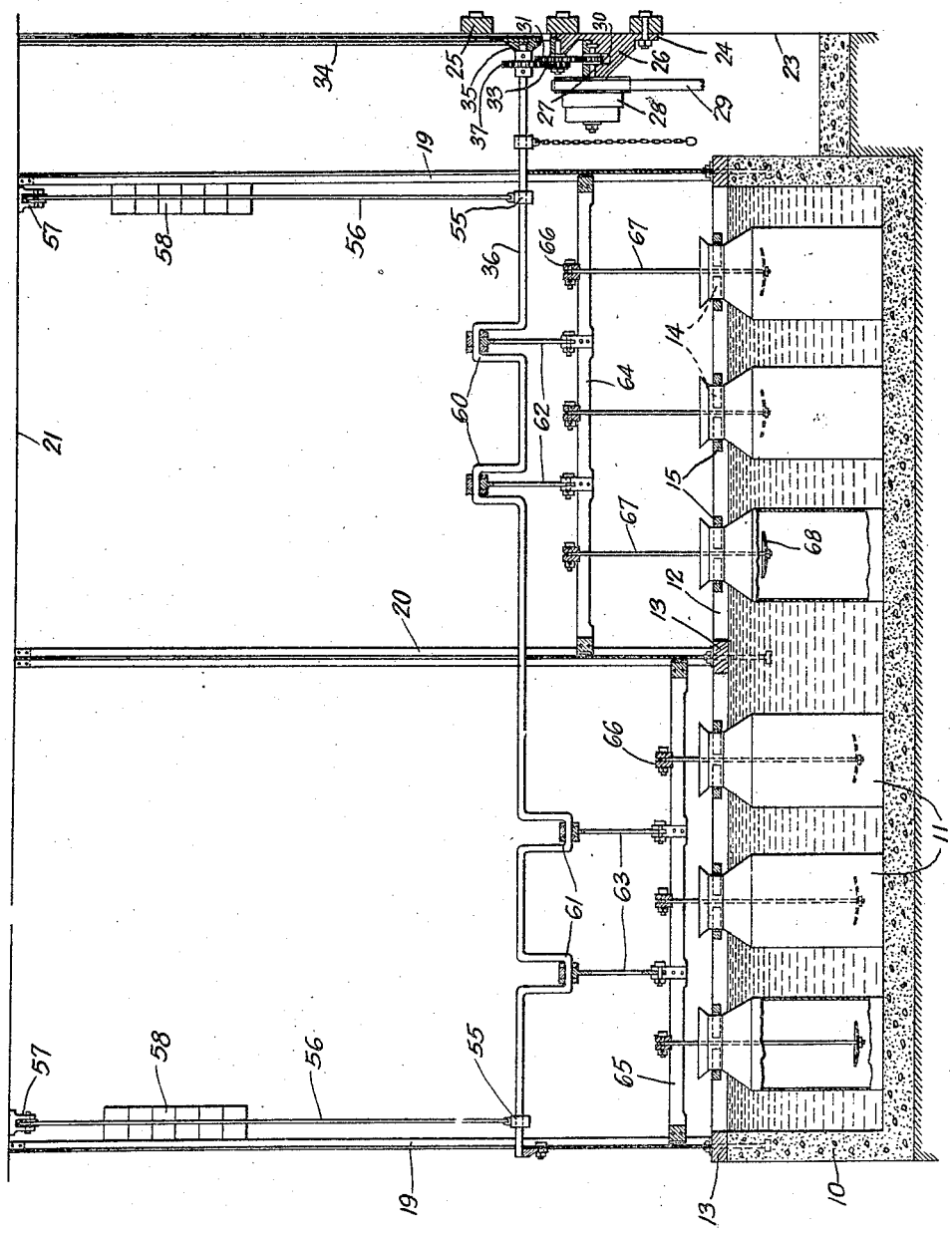

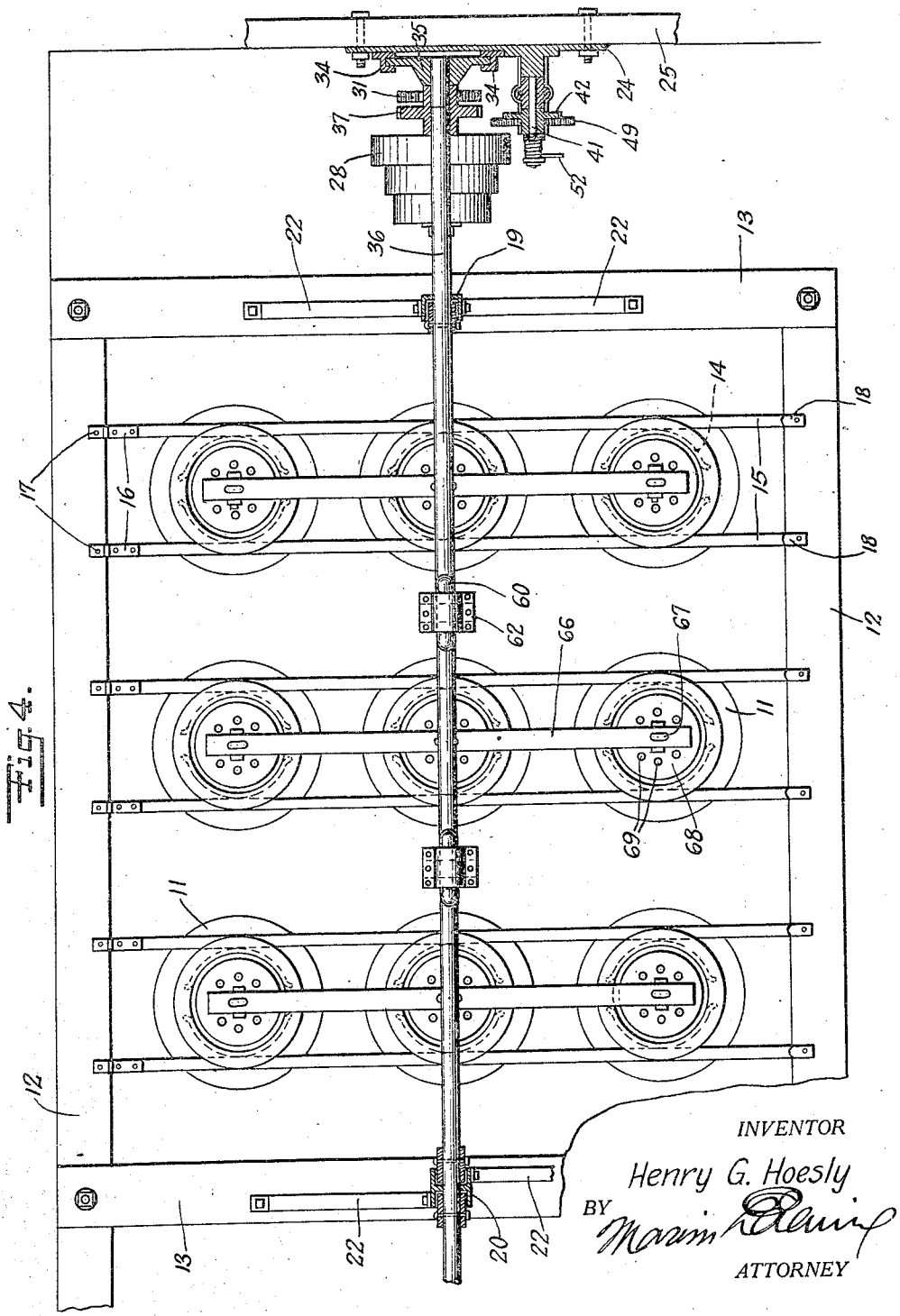

Patented May 13, 1924.

1,493,749

UNITED STATES PATENT OFFICE.

HENRY G. HOESLY, OF MONTICELLO, WISCONSIN, ASSIGNOR OF ONE-HALF TO JACOB J. RIEDER, OF NEW GLARUS, WISCONSIN.

MILK-COOLING MACHINE.

Application filed May 7, 1923. Serial No. 637,179.

*To all whom it may concern:*

Be it known that I, HENRY G. HOESLY, a citizen of Switzerland, residing at Monticello, in the county of Green and State of Wisconsin, have invented certain new and useful Improvements in Milk-Cooling Machines, of which the following is a specification.

This invention relates to improvements in dairy apparatus and particularly to milk cooling machines, having as one of its objects to provide a water filled tank in which may be placed a plurality of milk filled cans, the cans resting on the bottom of the tank with their necks above the surface of the water, so that the contents of the cans may be cooled thereby.

Another purpose is to produce means for agitating the contents of the cans while in the tank by a mechanically actuated perforate disc, raised and lowered in the filled cans in such manner that the milk is caused to constantly change its position relative to the walls of the cans, thus bringing the entire contents rapidly to the temperature of the water.

A further aim is to provide releasable means for holding the cans in properly spaced position in the tank during the cooling process and thereafter be removed to facilitate changing the cans.

A still further object is to provide means for raising the entire agitating mechanism, at any desired time, by counterbalancing devices, completely out of the way when changing the cans in the tank.

These and other like objects are attained by the novel construction, combination and arrangement of parts hereinafter described and shown in the accompanying drawings, forming a material part of this disclosure, and in which:—

Figure 1 is a partial side elevational partial sectional view of a milk cooling machine made in accordance with the invention.

Figure 2 is an end elevational view of the same, also partially in section.

Figure 3 is an enlarged front view of the dasher driving and raising device used therewith.

Figure 4 is a fragmentary plan view illustrating the tank and can arrangement, together with the operating means, the latter being partially in section.

Figure 5 is an enlarged fragmentary sectional view taken on line 5—5 of Figure 3.

These drawings, which are largely diagrammatic, represent as the basis of the invention an oblong rectangular tank, generally designated by the numeral 10, the same being preferably made of cement, smooth finished interiorly and impervious to water.

Said tank may be of any size, according to the capacity of the dairy, that shown being capable of accommodating eighteen standard size milk cans 11 arranged in three rows, the cans being spaced apart at least a distance equal to half their diameter, which is approximately twelve inches.

Said cans rest upon their bottoms in the tank, the walls of which extend upward to the necks of the cans, the tank being provided with overflow, inlet and outlet means of ordinary type, not shown.

A frame composed of side beams 12 and end and center cross beams 13, is securely bolted to the upper edge of the tank walls, serving as a guard therefor and also as a foundation for the superstructure as will hereafter be seen.

In order to hold the cans properly positioned in the tank, pairs of spring arms 14, curved to suit the necks of the cans, are arranged in opposite relation and secured at spaced distances to the inner adjacent edges of bars 15 engaged by hinges 16, the outer leaf elements of which are secured by pivots 17 to one of the frame members 12 and held by clips 18 on the opposite frame member when adjusted, as best seen in Figure 4, this arrangement holding the cans in proper position in the tank.

A pair of opposed channels 19 are fixed on the end or cross beams 13 to extend vertically upward and an I beam 20 is similarly erected on the center cross beam, these rolled structural steel elements being connected at the tops by a rail or the ceiling 21 of the building in which the tank is located, and are held rigidly in position by a plurality of braces 22 bolted to the cross beams.

On one of the end walls 23 of the building is bolted a plate 24, re-enforced by stringers 25, and having a bracket 26 in which is mounted a revoluble shaft 27, its end extending toward the tank, above and at its center and fixed on the shaft is a driving pulley 28 over which is trained a belt 29 leading to any convenient source of power.

Also fixed on the shaft 27 is a gear 30, meshing with an idle gear 31 rotatable on a stud 32 fixed in the upper part of the bracket and alongside the gear is a pinion 33.

A vertical guideway composed of upright elements 34 in which a plate 35 is slidably arranged and rotatable in the plate is one end of a shaft 36 to which is fixed a gear 37 engageable operatively with the pinion 33 when the plate is down, said plate having attached at its upper end a cable 38 running over sheaves 39 carried by the ceiling 21 and held in adjustment by a counterbalancing weight 40.

A stud 41 fixed in the plate 26 has rotatably mounted on it a ratchet wheel 42 operated by a pawl 43 slidably mounted in a bracket 44, the opposite end of the pawl being downturned to engage a pin 45 fixed in the face of the gear 37 and is normally held out in an engaging position by a coiled compression spring 46, being limited by a stop pin 47.

Fixed to the side of the ratchet wheel 42 is a pinion 48 in mesh with the teeth of a spur gear 49, to which is attached a drum 50 having wound upon it a cord 51 fixed to a pointer 52 movable vertical in a guideway 53 and acting as an index for a series of graduations 54 on the sideway which determine the operation of the machine.

The shaft 36, in addition to its end bearing in the plate 35, is loosely mounted in bearings 55 supported by cables 56 running over sheaves 57 attached to the ceiling 21 and provided with counterbalancing weights 58.

A pull chain 59 is provided for drawing the shaft down, causing the gear train elements to engage, thus causing the shaft to rotate, and it will be understood that the uprights 19 and 20 are slotted to permit the shaft to raise and lower.

Formed on the shaft 36 are pairs of crank throws 60 and 61, one pair being opposite to the other and engaging these cranks are connection rods 62 and 63, operatively engaged with bars 64 and 65, guided at their ends in the vertical elements 19 and 20.

Attached to these bars are cross bars 66 used as suspenders for pivoted rods 67, connected at their lower ends with concave circular plates 68 of such diameter as to readily pass into the milk cans and provided with perforations 69 through which the milk passes as the plates are raised or lowered by the cranks of the shaft 36 when rotated.

In operation, the shaft 36, plate 35 and associated parts are raised bodily to such height above the walls of the tank as to readily permit the cans to be removed or replaced in a filled condition.

This is accomplished by swinging the bars 15 outwardly and raising them on their hinges, releasing the spring arms 14 from embracing the cans to permit their replacement.

When the freshly filled cans have been entered in the tank and arranged approximately in their proper location, the bars 15 and spring arms are arranged to grip and hold the cans rigidly in position in the tank, and the chain 59 pulled, lowering the shaft.

The plates 68 are entered in the cans, the throw of the cranks being such as to move the plates up and down in the cans without touching their bottoms or coming out at the top and a relatively slow motion is imparted to the train of gears from the pulley to the shaft, this churning motion being continued only for a short time.

The number of reciprocations transmitted to the plates 68 is indicated on the index 54 by the pointer 52, which is automatically reset by raising the plate 25.

In addition to the foregoing, if the device be operated by an electric motor, a knife switch, generally designated by the numeral 70, may be mounted on a bracket 71, adjacent the plate 24, immediately back of the support 72 of the index 54, so that as the latter is lowered, a block 73 fixed to the cable 51 will make contact with the lever of the switch, thus automatically closing the same and stopping the motor.

From the foregoing it will be seen that a complete and practical device for cooling milk has been disclosed in the preferred form of its embodiment, but it will be understood that minor changes in construction may be resorted to which do not interfere with the scope and spirit of the invention as defined by the subjoined claims.

Having thus described my invention and set forth the manner of its construction and use, what I claim as new and desire to secure by Letters Patent, is:—

1. A milk cooling machine comprising a tank suited to receive a plurality of cans, pairs of bars hinged to one of the walls of the tank, and secured at the other, and curved spring strips fixed on the adjacent sides of said bars to engage automatically on opposite sides of each can in locating and clamping the same in spaced relation midway between the pairs of said bars.

2. A milk cooling machine comprising a tank suited to receive a plurality of cans in predetermined position, a dasher movable in each can, means for reciprocatively operating said dasher including a cranked shaft mounted above said tank in a horizontal plane having operative connections with the dashers, means for raising and lowering said shaft together with its associated parts, and means for communicating positive rotary motion to said shaft when in its lowermost position, said shaft being quiescent when raised.

3. A milk cooling machine comprising a tank suited to receive a plurality of cans in predetermined position, a dasher in each can, a cranked shaft over the tank, connections between said dashers and the cranks of the shaft, means permitting said shaft to be raised or lowered, a driven gear train adjacent said tank, and a gear on said shaft engaging said train when the shaft is in a lowered position.

In witness whereof I have affixed my signature.

HENRY G. HOESLY.